June 5, 1956 P. R. GRISKELL 2,749,417
PORTABLE ELECTRIC SPOT WELDER
Filed Dec. 26, 1952 4 Sheets-Sheet 3
FIG. 4.
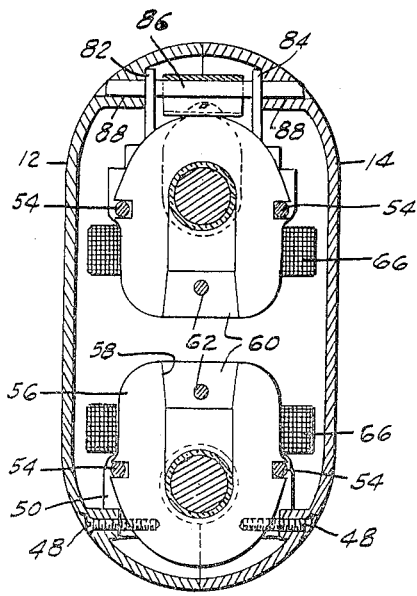
FIG. 3.
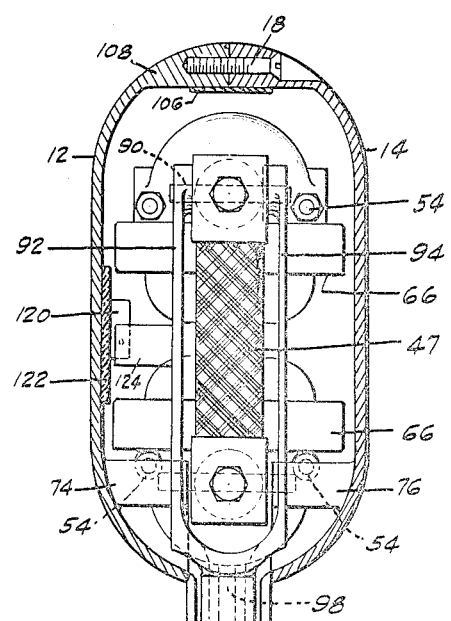
FIG. 5.
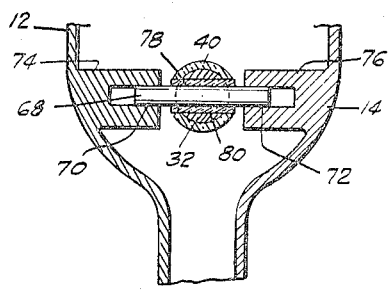
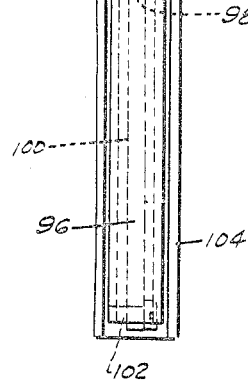
FIG. 6.
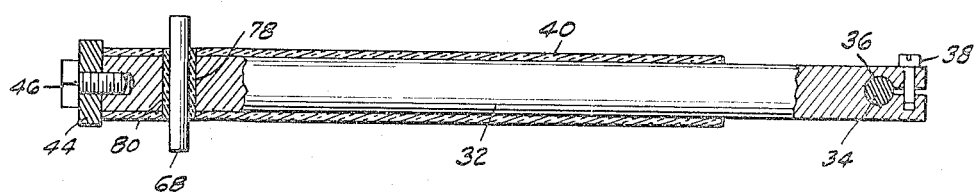
INVENTOR.
PHILIP R. GRISKELL
BY John B. Hosty
ATTORNEY.

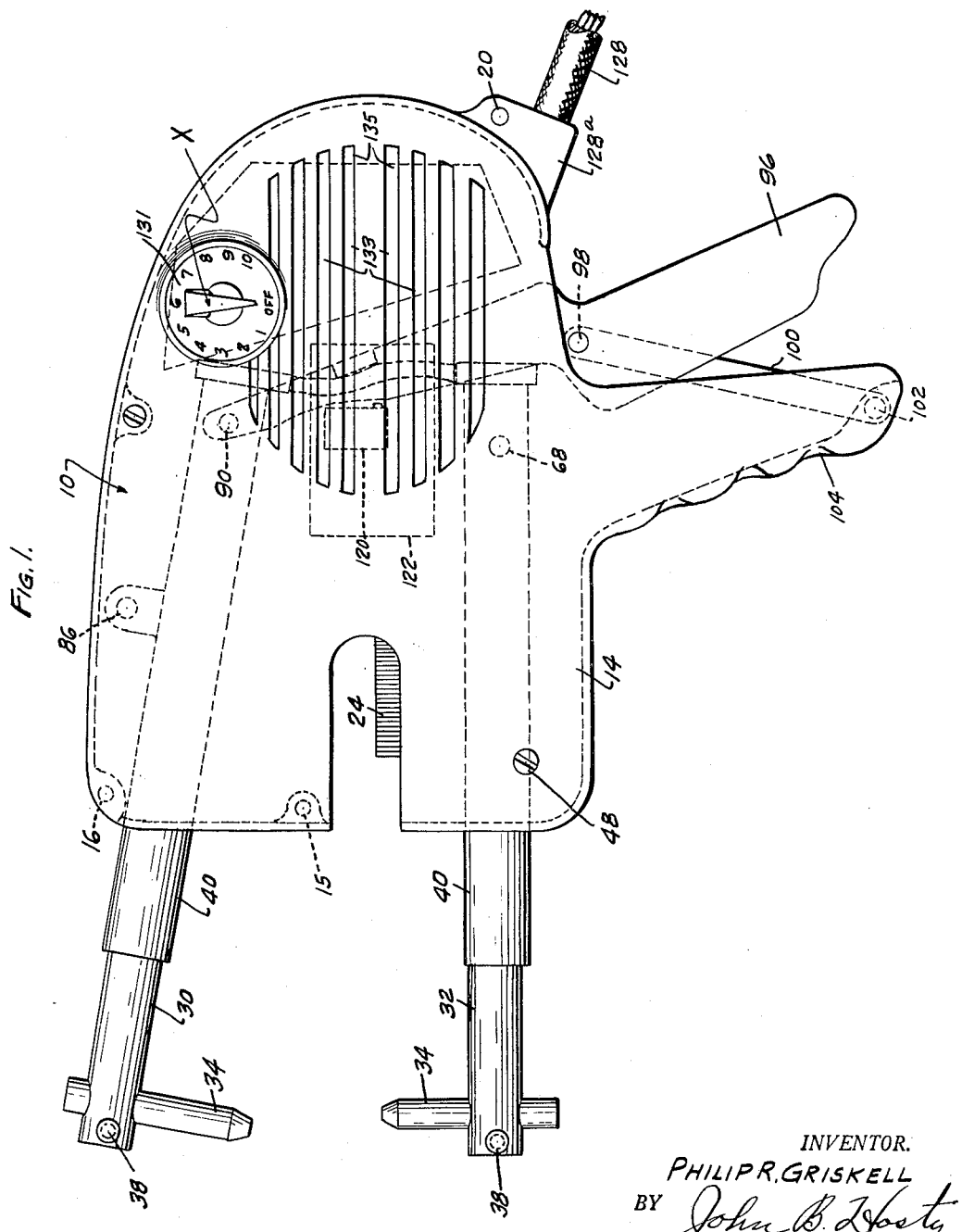

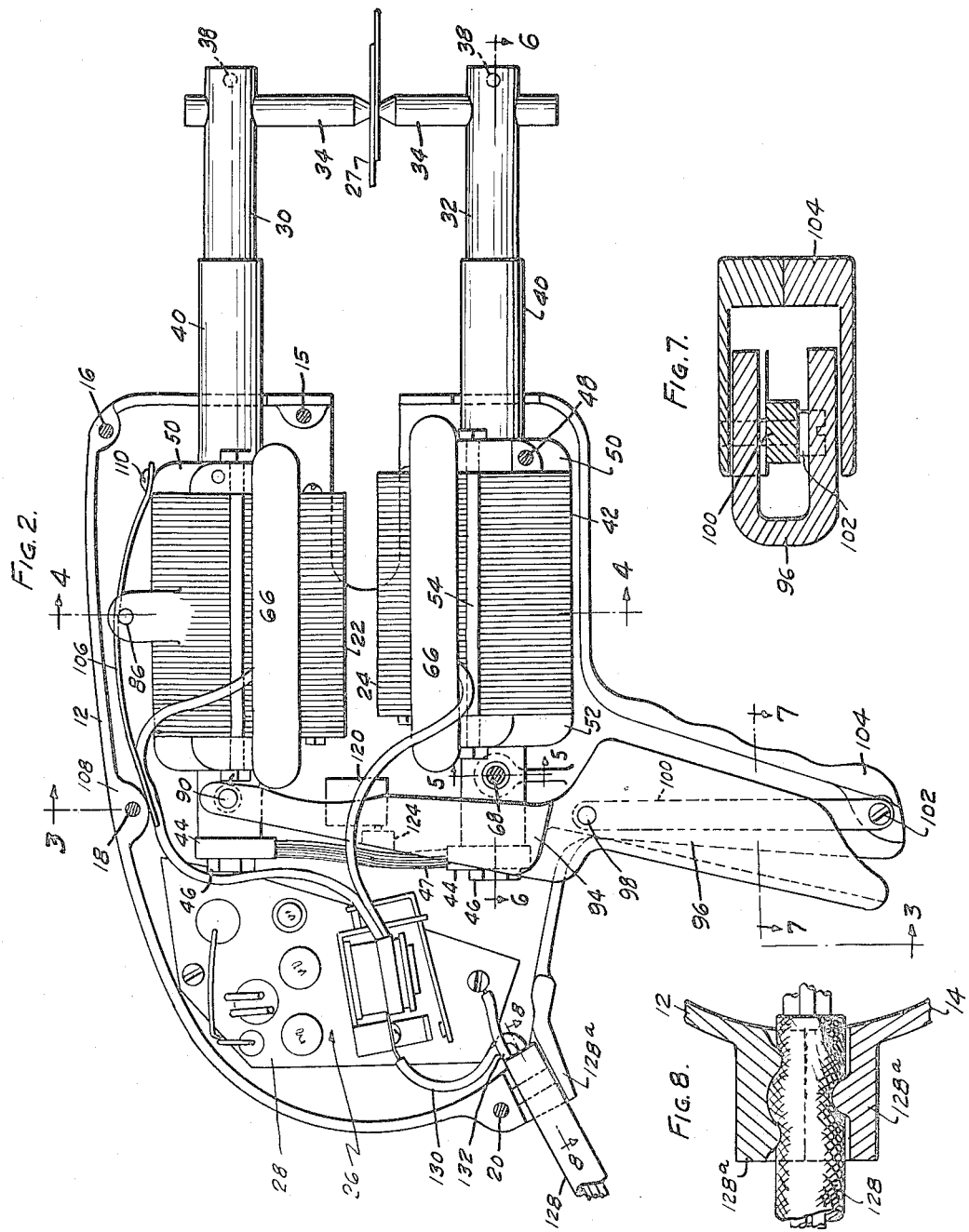

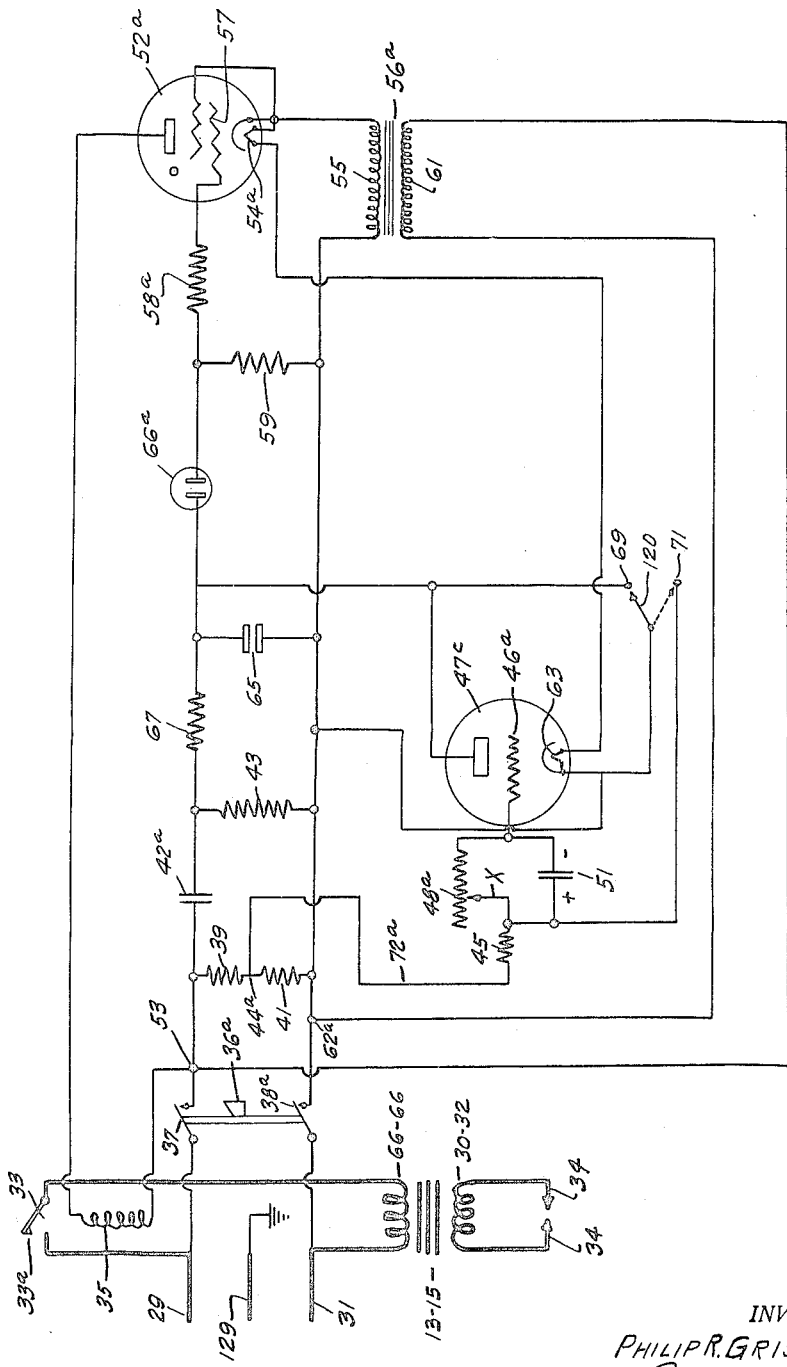

2,749,417
Patented June 5, 1956

2,749,417
PORTABLE ELECTRIC SPOT WELDER
Philip R. Griskell, Oak Lawn, Ill.

Application December 26, 1952, Serial No. 328,083

5 Claims. (Cl. 219—4)

My invention relates to improvements in electric welding machines.

My invention relates more particularly to the provision of an improved portable spot welding machine.

The invention contemplates the provision of a gun type trigger operated spot welding maching having a pair of electrode holders extending forwardly therefrom, each electrode holder carrying a transversely mounted electrode between which plates or sheets may be placed to be welded when engaged by the electrodes.

A further object of the invention is the provision in a hand spot welding gun of the type described of improved means for mounting one electrode holder in a fixed position and other means for mounting the other electrode holder in a pivotally movable position.

A further object of the invention is to provide improved spring means for automatically returning the movable electrode holder to open or non-welding position whenever the trigger-grip on the handle is released.

A further object of the invention is to provide an improved mounting for both the stationary and movable electrode holders capable of universal adjustment for accurate alignment of the electrode tips.

A further object of the invention is to provide means responsive to pressure on the trigger grip of the welding gun to automatically cause current to flow to the gun.

A further object of the invention is the provision of a portable spot welder of the type described which utilizes a pistol type grip and trigger by means of which the gun may be held in and operated by one hand, leaving the operator's other hand free to hold the work, adjust its position, or for any other purpose.

A further feature is the automatic switch arrangement actuated by the operating handle to turn on the current when the tips reach the fully closed position. This mechanism includes a small switch which controls the voltage on the grid of a thyraton tube. This tube in turn controls a relay in such a manner as to prevent the closing or opening of the relay at any time except the instant when the current through the contacts is at or near zero. This is posible because an alternating current passes through a zero value twice every cycle. The advantage of this arrangement is that it eliminates arcing of the contacts. This lengthens the life of the relay and permits use of a much smaller relay.

For the purpose of illustrating the invention which comprises the essential features of construction as pointed out in the appended claims, I have shown in the accompanying drawings and shall describe in the present specification a certain preferred embodiment of the invention which has been fully tested and found in actual practice to give satisfactory and reliable results. In this connection it is to be understood that the several parts and elements which make up this organization may be varied within the scope of the invention and the claims, the invention not being limited to the precise details of the illustrated embodiment.

In the drawings,

Fig. 1 is a side elevational view of my improved portable spot welder showing the electrodes in an open position, as well as the pistol grip which operates the same;

Fig. 2 is an elevational view of the spot welder, the view being from the opposite side of the view shown in Fig. 1, the view being taken with the half cover removed and showing the electrodes and other elements in a spot welding position;

Fig. 3 is a vertical sectional view showing the trigger operating mechanism and associated parts taken generally on the line 3—3 of Fig. 2;

Fig. 4 is a vertical sectional view through the housing electrode holders and primary coils taken generally on the line 4—4 of Fig. 2;

Fig. 5 is a fragmentary sectional view showing the back mounting of the stationary electrode holder, taken on the line 5—5 of Fig. 2;

Fig. 6 is a horizontal sectional view thereof taken on the line 6—6 of Fig. 2;

Fig. 7 is a cross-sectional view through the pistol grip of the housing and the trigger portion taken generally on the line 7—7 of Fig. 2; and Fig. 8 is a fragmentary sectional view through the cable inlet of the housing taken on the line 8—8 of Fig. 2.

Fig. 9 is a wiring diagram of the circuit.

In the embodiment of the invention which I have chosen to illustrate and describe the same, in Fig. 1 I have shown an elevational view of the spot welder which may include a housing 10 formed of the two half sections 12 and 14, the same being suitably fastened together at numerous points such as adjacent the front end of the housing by the bolts 15 and 16, medially of the same by the bolt 18, and adjacent the cable entrance by the bolt 20.

The internal mechanism may include a pair of transformers having the primary coils 22 and 24 and a circuit control 26 which will be hereinafter described. The circuit control is mounted upon a Bakelite panel 28 in the back end of the housing 10, the panel being fastened by suitable screw members to the housing portion 12. Thus when it is desired to have access to the internal mechanism of the gun, the same is readily accessible by removing the bolts which hold the housing section 14 to the housing section 12.

The electrode holders may comprise a pair of copper rods 30 and 32, each having at its end a welding electrode 34 fastened transversely of the same through an opening 36, the electrodes being adjustably held in the ends of the same by means of screw members 38.

Each of the electrode holders 30 and 32 is mounted in an insulating tube 40 which passes through the laminated core 42 of the transformers and has a metal block 44 fastened to the back end of the same by means of a bolt member 46. The blocks 44 are electrically connected by a heavy wire conductor 47 which is capable of flexing with the movement of the transformer 22.

The transformer 24 and associated parts are adapted to be fixedly held in the housing portion 12 by means of bolt members 48 which are screw-threadedly mounted in the end frame member 50 of the transformer 24, each transformer having duplicate frame members 50 and 52 at the two ends of the laminated core, the same holding the laminations together by means of a pair of bolt members 54 which connect the same upon the opposite sides thereof. The laminations of the core may comprise generally horse-shoe shaped segments 56 which have a tapered throat 58 to receive the tapered wedge members 60 that are fastened upon a bolt member 62. The primary winding 66, as shown, is fastened about the laminations 56 above the bolt members 54.

The back end of the electrode holder 32 may be fastened by means of a pin member 68 in a pair of aligned sockets 70 and 72 in inwardly extending bosses 74 and 76 on the housing portions 12 and 14 respectively. The pin is insulated from the copper electrode holder 32 by a suitable insulating collar 78 which fastens about the pin 68 in the opening 80 through the electrode holder 32.

The movable electrode holder 22 and associated parts are mounted by means of a pair of brackets 82 and 84 which are attached to the laminated core 42, the brackets having an opening therethrough to hang suspended from a pin 86 which is mounted in a pair of aligned openings 88 in the housing portions 12 and 14 respectively.

The back end of the electrode holder 30 has a pin 90 extending therethrough, the pin connecting the electrode holder to a pair of arms 92 and 94 of the pivoted trigger member 96. The trigger member is pivotally mounted adjacent the lower edge of the housing by means of a pin 98 upon a link 100 which is fastened adjacent its low end by a pin 102 to the stationary grip portion 104 of the trigger mechanism.

I provide a comparatively strong flat spring blade 106 which is positioned in the upper portion of the housing against a boss 108, the opposite end of the same being fastened by a screw member 110 to the end frame 150 of the transformer 22. The spring is flexed to ride over the top of the support pin 86 for the transformer 22 so that the normal action of the spring is to straighten out and move the forward end of the transformer and associated parts upwardly to the open position of the welding electrodes shown in Fig. 1. This action operates to move the trigger 96 away from the pistol grip 104 to the open position shown in Fig. 1.

When it is desired to perform a welding operation, the pistol grip is grasped in the operator's hand and the handle of the trigger portion moved forward against the stationary portion 104 of the handle on the housing to bring the welding points together as shown in Fig. 2. In effecting this movement I also close a microswitch 120 which is mounted on a Bakelite panel 122 in the housing portion 14. The switch is actuated by means of a lug 124 which is fastened to the side of arm 92 of the pivoted trigger member 96.

A further feature of the construction resides in the fastening of the cable 128 against movement in the housing 10. This is done by extending a pair of bracket portions 130 outwardly from the housing 10, the same being provided with alternate ridges which press against the cable 128 to frictionally hold the same against movement inwardly or outwardly. The wires 130 and 132 may extend in to the panel 26 and be suitably connected to the wiring circuit which is mounted on the panel.

The timing circuit which I prefer to employ may be generally similar to that shown in Fig. 9 which embodies the features of a circuit shown and described in my copending application, Serial No. 328,084. In this circuit line service is brought into the unit through the flexible armored cable 128 carrying the line wires 29 and 31 as well as a ground conductor 129. The energizing circuit for introducing the line current into the primary windings 66 is closed by a relay switch 33 normally open under the supervision of the principal operating relay whose winding is designated 35. The secondary loop or winding of the transformer is made up of the already described axial elements 30 and 32, the flexible conductive section 47 and the electrode elements 34—34. Since this loop remains open until firm and positive contact is made with the work 27, corresponding precautionary safety is inherent in the device through proper regulation and placement of the electrodes.

Line service is extended from the incoming conductors 29 and 31 to the control circuit components by the operation of a double pole manual switch 36a including the contactors 37 and 38a. Upon closure of the aforedescribed switch 36a, an alternating current voltage is extended to the series resistance network including resistance elements 39 and 41, condenser 42a, and a bridging resistance 43. At midpoint 44a between the resistors 39 and 41, a line tap is made through the timing circuit resistor 45 forming part of the bleeder path to which is connected the grid 46a of a timing thermionic valve 47c. The variable resistor or potentiometer 48a is manually set by a control pointer X to establish the rate of discharge permitted to the condenser 51, and in this way there is established the effective period when the grid 46a becomes sufficiently negative to make vacuum tube 47a conductive.

Closure of the welding circuit by relay 33 is effected when the thyratron tube 52a is made conductive and the operation thereof is as follows. One terminal of winding 35 is connected to the plate of thyratron tube 52a and the other terminal is traceable to a junction 53 in the continuation circuit of service line 29. The cathode 54a is connected through the secondary winding 55 of a transformer 56a with the continuation line of the opposite service conductor 31. Accordingly, with the alternating voltage opposite current characteristics are placed upon plate and cathode during consecutive cycles, but current is prevented from flowing during the half-cycle when the plate is positive as a consequence of the following apparatus. During the time that the plate of tube 52a is positive, grid 57 is sustained negative over a circuit traceable through resistors 58a and 59 which are connected to the opposite terminal of secondary winding 55. The primary winding 61 of transformer 56a is connected at junctions 53 and 62a with the line extensions under the control of switch 36a. The filaments of both cathodes 54a and 63 are heated in series by the secondary winding 55 of the circuit when it is positive. The negative bias on grid 57 is periodically diminished by a condenser charge which is the result of the cyclic reversals upon a condenser 65 whose full charge during the critical half-cycle is designed to exceed the characteristics of a neon tube 66a, whereupon the discharge is extended through resistor 59 and superimposed upon the secondary winding 55. The duration of this discharge is made very brief and the values of condensers 42a and 65, as well as of resistors 43 and 67, are chosen with this purpose in mind.

When the grid 57 of thyratron 52a is thus made sufficiently positive, voltage is permitted to flow in the winding of relay 33, and for the duration of a half-cycle of the alternating current cycle, contactor 33a is maintained closed. By designing relay 33 with the usual slow-to-release characteristics, its effect may be continued until the thyratron action is totally arrested.

To stop the operation of thyratron tube 52a, it is necessary to remove the aforedescribed positive bias from its grid 57. This is accomplished by the vacuum tube 47 in the following manner. Attention is now again directed to the rheostat X which, as has been said, is adjustable to accord with the intensity of weld desired. Also it will be borne in mind that the spring biased switch 120 which is normally maintained in engagement with its contact 69, becomes moved to its alternative position 71 coincident with the mechanical operation involving pistol grip lever 96.

So long as switch 120 is in its solid outline position, condenser 65 is shunted out of circuit and is therefore unable to receive charges until the aforedescribed pistol grip operation, whereupon contactor 120 opens its shunting circuit. Also it is to be noted that before the pistol grip operation, current is permitted to flow from the junction 44a overlying 72a through the resistance 45 to one side of condenser 51 which becomes negatively charged due to the rectifier action between the grid 46a and cathode 63 of tube 47. As a consequence of the mechanical start action, contactor 120 is moved to its dotted outline position and condenser 65 is enabled to receive its alternating charges, of which only those which are positively conducted through neon tube 66a are effective. At the same time, condenser 51 is enabled to build up a negative charge preventing the flow of current through tube 47. Immediately, however, condenser 51 begins discharging slowly through the rheostat adjustment X until its residual voltage is sufficiently diminished to impair the effectiveness of grid 46a, whereupon tube 47 becomes conductive. This reestablishes the shunting circuit associated with condenser 63 whereupon grid 57 is allowed to resume its negative characteristic, impairing the firing of thyratron 52a.

As shown in Fig. 1, the timer control X is mounted on the side of the housing member 14 overlying a dial 131 upon which indicia is provided to show an off position or any desired duration of weld from one to tenseconds. I also provide elongated openings 133 in the side of the housing members 12 and 14, the same being preferably covered on the inside with a screen 135 to prevent foreign material from entering the housing.

From the above and foregoing description it can be seen that I have provided an improved construction of portable gun type spot welder which is capable of simple operation even by inexperienced operators. The lower electrode and electrode holder may be brought into definite alignment with the upper electrode and electrode holder by loosening or fastening the bolt members 48 which fasten the front end of the same in the housing. This permits a sidewise adjustment within limits, the pivot bolt 78 being loosely mounted in the openings 70 and 72 to permit a slight play therein. In addition, by means of the simple pivotal hanging of the upper transformer element 22 upon the pivot bolt 86 and the provision of the flat leaf spring 106 attached to the forward end of the same, upon the release of the pistol grip 96, the welding electrodes will be automatically moved to inoperative position.

While I have illustrated and described a specific embodiment of the invention, it will be apparent to those skilled in the art that changes and modifications may be made in the exact details shown and I do not wish to be limited in any particular rather what I desired to secure and protect by Letters Patent of the United States is:

1. A manually operable portable electric spot welder comprising a housing consisting of two similar halves bolted together, said housing having a pistol grip extending downwardly therefrom a stationary transformer having an electrode mounted in the lower part of said housing and a pivoted transformer having an electrode mounted thereabove in the upper part of said housing, a leaf spring normally holding said upper electrode in inoperative position, each of said transformers having a copper electrode holder extending axially therethrough, the back ends of said electrode holders having a conduit connecting the same together, the other ends of said electrode holders extending forward through openings in the front of said housing, a welding electrode mounted transversely in the forward end of each of said holders, and a lever pivotally connected to the upper electrode holder and to the bottom of the pistol grip on said housing, said lever normally held in open position by said leaf spring.

2. A manually operable portable electric spot welder comprising a housing consisting of two similar halves bolted together, said housing having a pistol grip extending downwardly therefrom, a stationary transformer having an electrode mounted in the lower part of said housing and a pivoted transformer having an electrode mounted thereabove in the upper part of said housing, a leaf spring normally holding said upper electrode in inoperative position, each of said transformers having a copper electrode holder extending axially therethrough, the back ends of said electrode holders having a conduit connecting the same together, the other ends of said electrode holders extending forward through openings in the front of said housing, a welding electrode mounted transversely in the forward end of each of said holders, and a lever pivotally connected to the upper electrode holder and to the bottom of the pistol grip on said housing, said lever normally held in open position by said leaf spring, said leaf spring fastened to one end of said pivoted transformer and bearing against a wall of said housing.

3. A portable electric spot welder comprising a housing consisting of two similar halves bolted together, said housing having a pistol grip handle, a stationary transformer mounted in the lower part of said housing, a pin positioned across the top of said housing, a transformer pivotally mounted on said pin and suspended in the upper part of said housing, each of said transformers including an electrode, a leaf spring normally holding said upper electrode in inoperative position, said leaf spring fastened to one end of said transformer and positioned under tension over said pivot pin, each of said transformers having a copper electrode holder extending axially therethrough, the back ends of said electrode holders having a conduit connecting the same together, the other ends of said electrode holders extending forward through openings in the front of said housing, a welding electrode mounted transversely in the forward end of each of said holders, and a lever pivotally connected to the upper electrode holder and to the bottom of the pistol grip on said housing, said lever normally held in open position by said leaf spring.

4. A portable electric spot welder comprising a housing consisting of two similar halves bolted together, said housings having a pistol grip handle, a stationary transformer mounted in the lower part of said housing, a pin positioned across the top of said housing, a transformer pivotally mounted on said pin and suspended in the upper part of said housing, each of said transformers including an electrode, a leaf spring normally holding said upper electrode in inoperative position, said leaf spring fastened to one end of said transformer and positioned under tension over said pivot pin, each of said transformers having a copper electrode holder extending axially therethrough, the back ends of said electrode holders having a conduit connecting the same together, the other ends of said electrode holders extending forward through openings in the front of said housing, a welding electrode mounted transversely in the forward end of each of said holders, and a lever pivotally connected to the upper electrode holder and to the bottom of the pistol grip on said housing, said lever normally held in open position by said leaf spring, said housing having a timing circuit control knob and dial mounting on its side.

5. A portable electric spot welder comprising a housing, a stationary transformer mounted in the lower part of said housing and a pivoted transformer mounted thereabove in the upper part of said housing, each of said transformers including an electrode, a leaf spring normally holding said upper electrode in inoperative position, each of said transformers having a copper electrode holder extending axially therethrough, the back ends of said electrode holders having a conduit connecting the same together, the other ends of said electrode holders extending forward through openings in the front of said housing, a welding electrode carried by each of said holders, and a lever pivotally connected to the upper electrode holder and to the bottom of the pistol grip on said housing, said lever normally held in open position by said leaf spring, said lever operable to bring said electrodes together for a welding operation.

References Cited in the file of this patent

UNITED STATES PATENTS

| | | |
|---|---|---|
| 1,078,675 | Heany | Nov. 18, 1913 |
| 1,312,845 | Gravell | Aug. 12, 1919 |
| 1,362,962 | Redfield et al. | Dec. 21, 1920 |
| 2,314,099 | Mikhalapov | Mar. 16, 1943 |
| 2,371,664 | Workman | Mar. 20, 1945 |
| 2,441,438 | Mulder | May 11, 1948 |

FOREIGN PATENTS

| | | |
|---|---|---|
| 813,866 | Germany | Sept. 17, 1951 |